Patented July 11, 1939

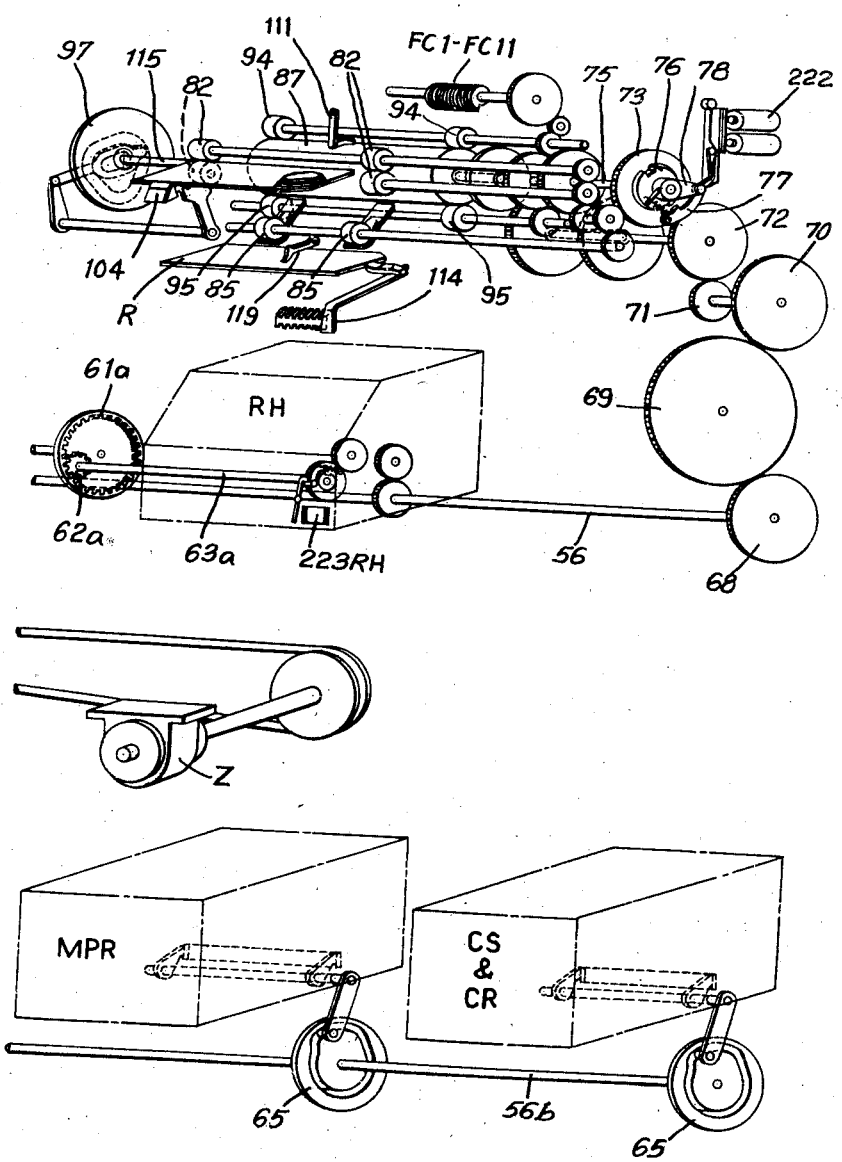

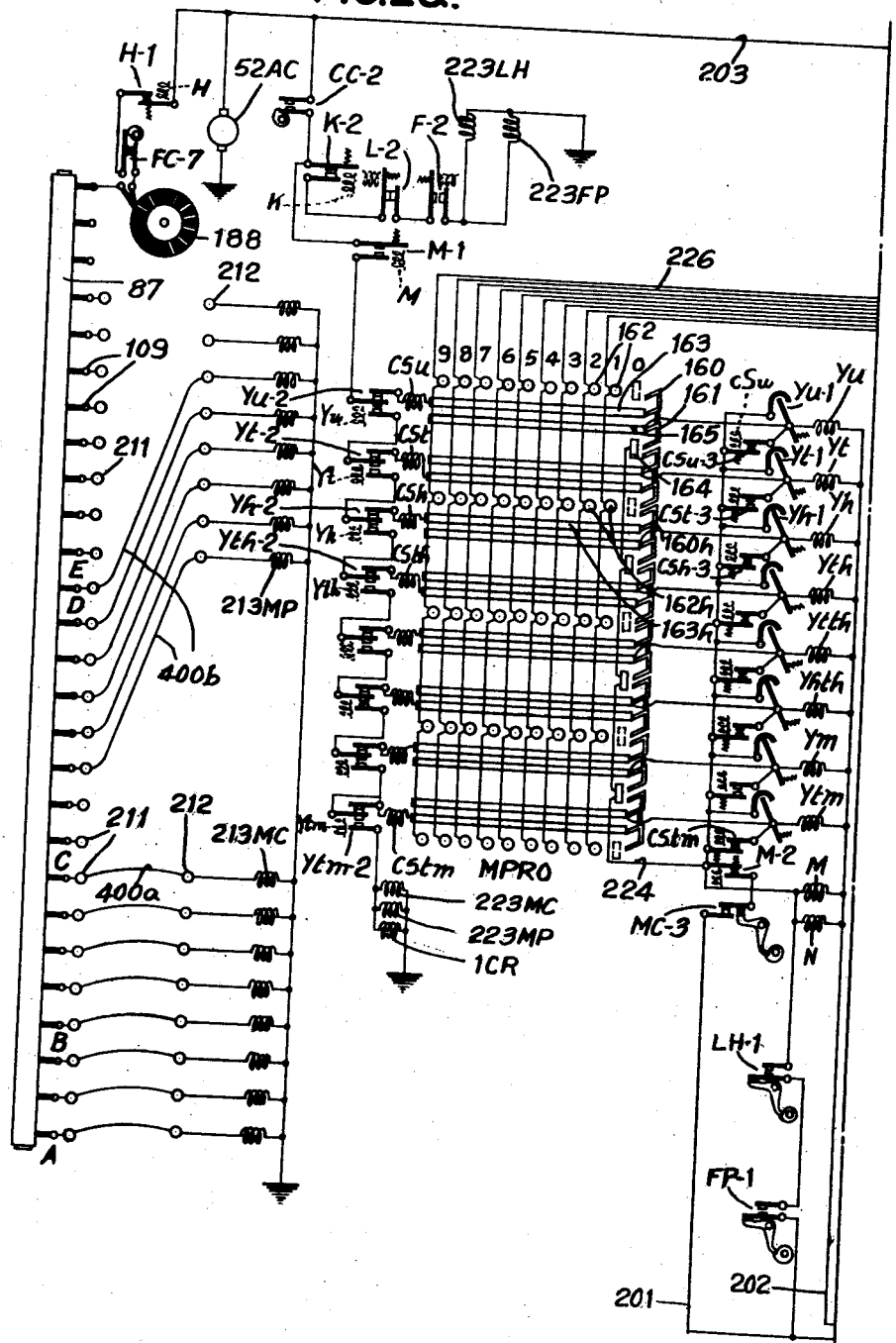

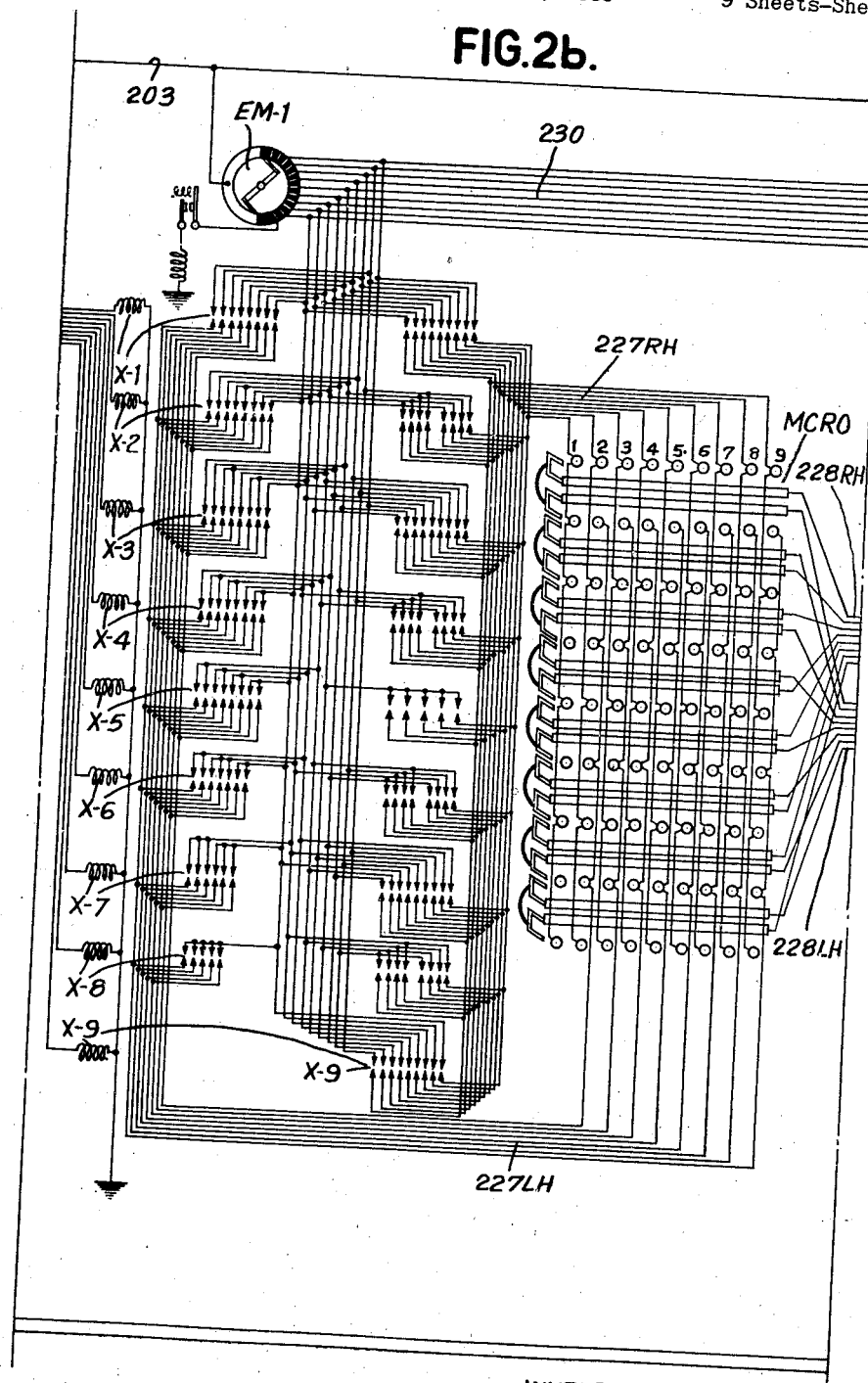

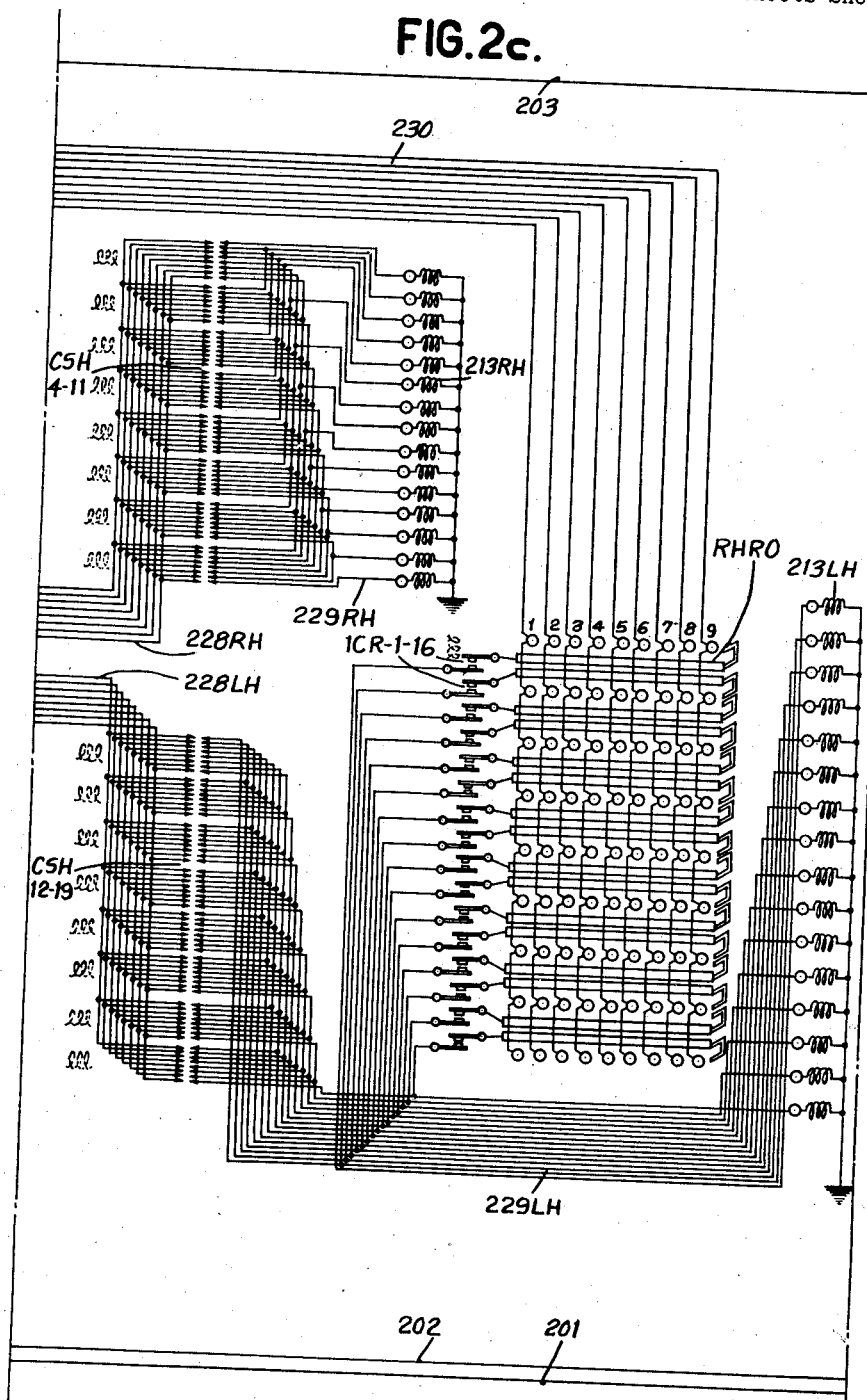

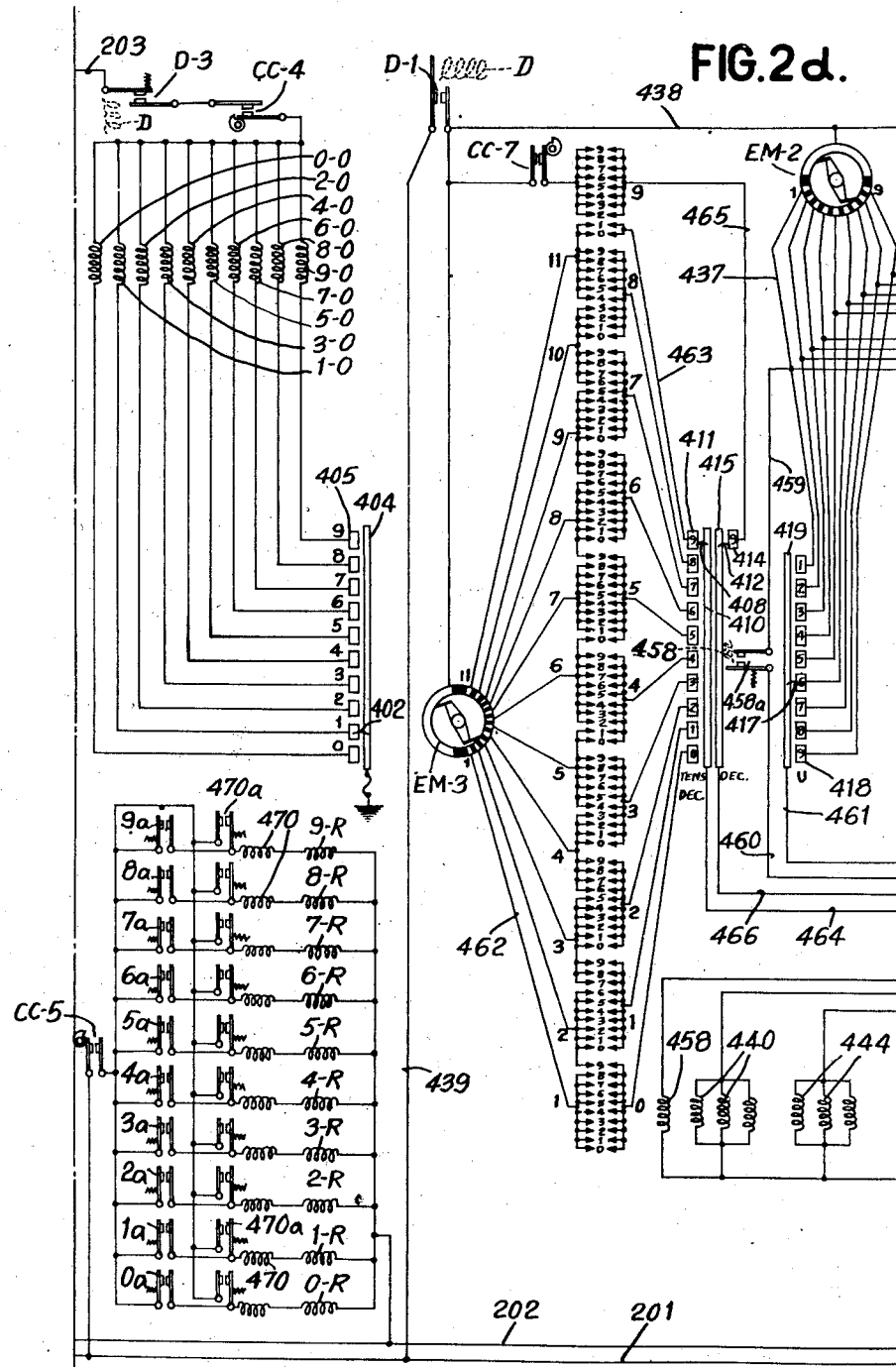

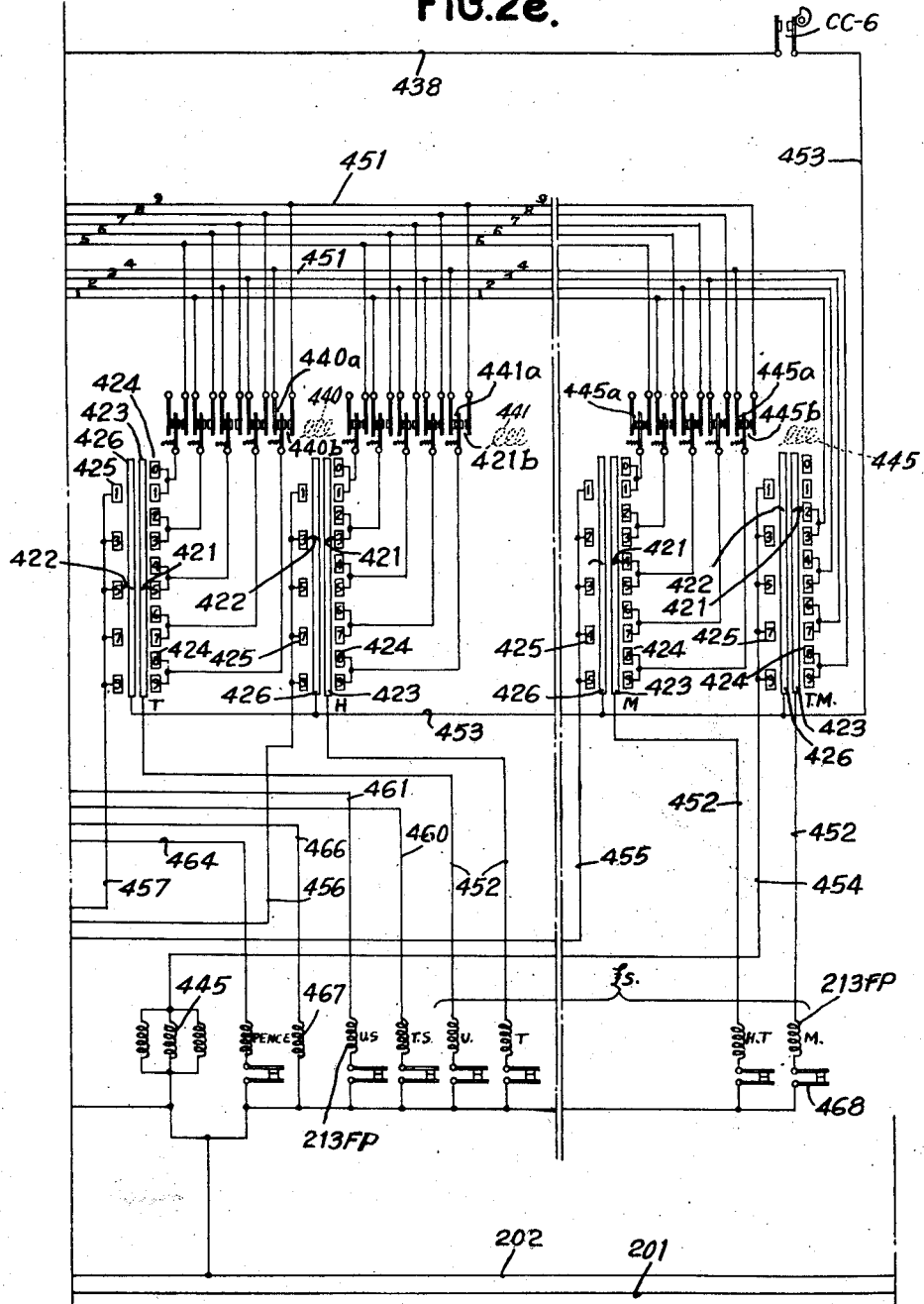

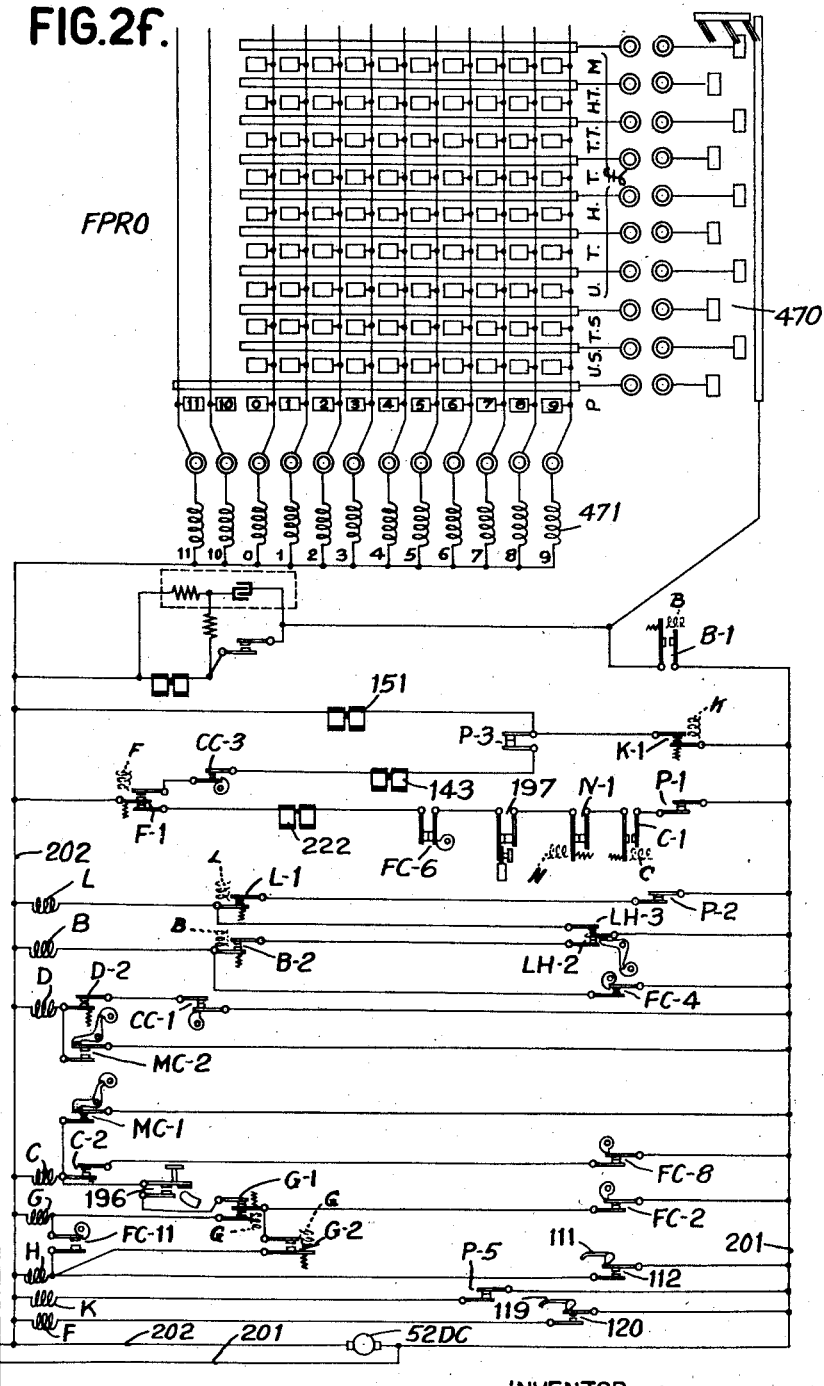

2,165,271

UNITED STATES PATENT OFFICE 2,165,271

MULTIPLYING MACHINE

Harold Hall Keen, Letchworth, England, assignor to International Business Machines Corporation, New York, N. Y., a corporation of New York Application March 6, 1935, Serial No. 9,531
In Great Britain April 6, 1934

3 Claims. (Cl. 235—61.6)

It is frequently desired to calculate the total cost of a given quantity of goods at a given price per unit quantity, and in many cases the price per unit quantity can be stated as a decimal fraction of one shilling. The quantity and price can be multiplied together in a machine of the above kind to give the total cost, as a decimal fraction of one shilling in the accumulator.

Broadly, the object of the present invention is to provide a machine of the above kind that will obtain the product of a decimal number and a decimal fraction of one shilling in terms of the British currency notation (i. e., the sterling notation).

According to the present invention a multiplying machine of the above kind comprises mechanism for dividing the integral part of the product obtained in the accumulator by twenty, to obtain a quotient and a remainder, and a register or recording mechanism for registering or recording the quotient and remainder obtained.

According to a feature of this invention the dividing mechanism is arranged to read the quotient and remainder out of the accumulator and transmit it into the register or recording mechanism as a sterling amount. For this purpose the dividing mechanism may comprise reading-out means for transmitting, to the register or recording mechanism, the digit registered in the units denomination of the accumulator, separate reading-out means for each higher denomination of the accumulator, each of which means is operable to transmit, to the register or recording mechanism, one-half (to the nearest lower integer) of the digit registered in its denomination, and, except the means associated with the highest denomination of the accumulator, also operable to transmit one-half (to the nearest lower integer) of the sum of ten and the digit registered, and a separate device for each denomination except the units denomination, each of which devices is arranged to determine whether the digit in its denomination is even or odd, and of which devices, that associated with the tens denomination is arranged to transmit unity to the register or recording mechanism if the tens digit is odd and zero if it is even, and those associated with the higher denomination are arranged to adjust each the reading-out means for the next lower denomination to operate in the first manner or the second manner, depending respectively on whether the digit in its denomination is odd or even.

According to a further feature of the present invention there is provided translating means operable to convert the digit registered by the tenths and hundredths denomination of the accumulator to an equivalent pence digit and to cause the register or recording mechanism to register or record said pence digit.

A preferred embodiment according to the present invention will now be described, by way of example only, with reference to the accompanying drawings, in which:

Figures 1a and 1b together show, diagrammatically, the general arrangement of a multiplying machine embodying the invention;

Figures 2a to 2f together form a circuit diagram for the machine;

The invention will be explained as applied to a record-card-controlled multiplying machine of the kind known commercially as the "Hollerith" multiplying punch. A machine of this kind is described in United States Patent No. 1,944,665, granted to D. J. Oldenboom on Jan. 23, 1934. British Patent specification No. 405,031 describes a similar machine, which, however, differs in certain respects from the machine described herein. Since machines of this kind have been fully described in the above and other patent specifications, the present machine will only be described sufficiently for an understanding of the present improvement.

General arrangement

Figure 1A:
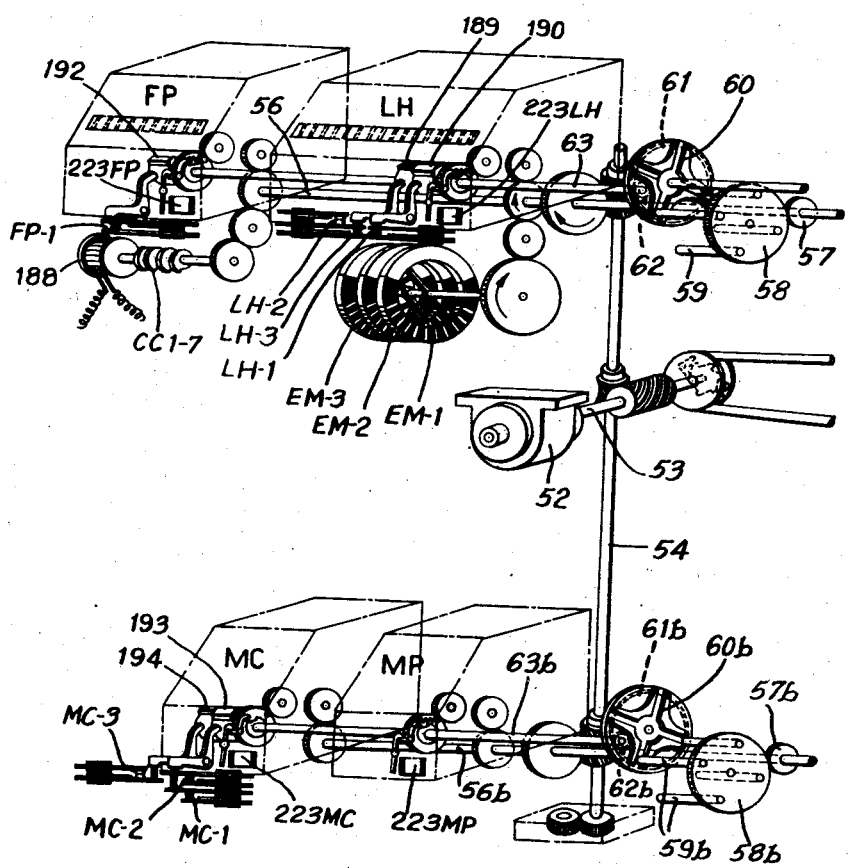

Referring first to Figures 1a and 1b, the machine is driven by a motor Z which drives a shaft 53. This shaft drives an A. C.-D. C. generator 52 and also drives a vertical shaft 54 through worm gearing. This shaft in turn drives a final product accumulator FP, a left-hand, or decimal product, accumulator LH, and a right-hand accumulator RH (Figure 1b). The shaft 56 carries a gear-wheel 57 (Figure 1a), which drives a gear-wheel 58. This gear-wheel, by Geneva mechanism 59, 60, drives two internal gear-wheels 61 and 61a (Figure 1b). These gear-wheels drive respectively gear-wheels 62 (Figure 1a) and 62a (Figure 1b), carried on reset shafts 63 and 63a. A separate one-revolution reset clutch is associated with each accumulator and when engaged on the energization of an associated reset magnet 223MP, 223LH or 223RH, couples the reset shaft 63 or the reset shaft 63a to the accumulator, so that the latter is reset in a well known manner. The shaft 56 also drives three impulse emitters EM1, EM2 and EM3, through the gearing shown, and cams for operating contacts CC1—7, which are operated once in every cycle of the machine.

The shaft 54 also drives a lower counter-shaft 56b (Figure 1a) which in turn drives a multiplier register MP and a multiplicand register MC. These registers are constituted by accumulators. A lower reset shaft 63b is driven in the same way as the upper reset shaft and the multiplier register MP and the multiplicand register MC can be coupled to this shaft for resetting by energizing reset magnets 223MP and 223MC respectively. The shaft 56b also carries two cams 65 (Figure 1b) which actuate mechanism associated with a number of multiplying relays MPR and a number of column-shift and control relays CS and CR. The construction of these relays is fully described in the prior British specification referred to above, and it will be sufficient to state that the function of the cams 65 is mechanically to restore the relays to their normal position at the end of each cycle in order that they may be selectively energized electrically during the following cycle.

Referring to Figure 1b, the shaft 56, through gearing 69—72, drives a gear-wheel 73. The gear-wheel 73 is loose on a shaft 75 and has a notched disc 76 secured to it. An arm 78 is secured on the shaft 75 and has a pawl 77 pivoted on it. Normally the pawl is held away from the notched disc 76 by the armature of a card-feed clutch magnet 222. When this magnet is energized momentarily, the pawl 77 is released and engages a notch in the disc 76 so as to couple the shaft 75 to the gear-wheel 73. The gear ratio is such that the shaft 75 turns through one revolution while the shaft 56 is turning through two revolutions.

The gear-wheel 73 operates card-feeding mechanism which is identical with that described in the United States specification referred to above, and need not be described in detail herein. It will be sufficient to state that the shaft 75 drives a cam 97 which operates a picker 104. This picker feeds the bottom card from a magazine to between two pairs of feed rolls 82. These feed rolls are driven continuously by the gear-wheel 73, and feed the cards between a conducting roller 87 and feed-rolls 94. The roller 87 and the feed-rolls 94 are driven by the shaft 75 so that they only rotate so long as the clutch comprising the pawl 77 and notched disc 76 is engaged.

When the card-feed clutch magnet 222 is energized, a card-feeding cycle occurs in which a card is fed by the picker 104 to the rollers 82 which in turn feed it to between the feed roll 94 and the roller 87. The card-feed clutch then disengages, and the card remains in this intermediate position while calculating operations are performed with respect to the preceding card. When the magnet 222 is again energised to initiate another card-feeding cycle, the roller 87 and the feed roll 94 feed the card past a row of brushes 109, not shown in Figure 1b but shown in Figure 2a. The card is then fed by the roller 87 and further feed-rolls 95, to a pair of feed rolls 85 which are driven continuously from the gear-wheel 73. The rollers 85 co-operate with guide-plates to feed the card into position R in the tray of a card-punching machine.

The construction of the punching machine is identical with that described in the specification referred to above, and it will be sufficient to state that it includes a card-feeding rack 114 which is operated automatically to feed the card into a positon in which the first column of a field that is to receive the product is beneath a row of punches.

From the foregoing, it will be seen that the first card-feeding cycle results in the card being advanced to the intermediate position and that in each succeeding cycle one card is fed past the brushes 109 and then delivered to the punching mechanism, while the following card is fed from the magazine to the intermediate position.

The shaft 75 also drives a series of cams for operating contacts FC1 to FC11. These contacts are operated only during card-feeding cycles. When a card is in the intermediate position, it rocks a card-lever 111 which closes a pair of contacts 112 (lower right, Figure 2f). When a card is in the R position, Figure 1b, it rocks a card lever 119 which closes contacts 120 (lower right, Figure 2f).

*General operation*

The machine is arranged to multiply a multiplicand comprising shillings and decimals of one shilling by a multiplier which may also comprise decimal places. The multiplicand is read from the card and entered into the multiplicand register, while the multiplier is also read from the card and entered into the multiplier register. The shillings amount in the multiplicand register is then multiplied by each digit of the amount in the multiplier register, and two partial products are accumulated, one in the right-hand accumulator RH and the other in the left-hand accumulator LH. After multiplication is completed, the partial product in the product in the right-hand accumulator is transferred to the left-hand accumulator to give the full decimal product, and concurrently the multiplicand and multiplier registers are reset. During these operations the card which has just been read is passed to the punching machine and fed into position to have the product recorded on it. The machine can also be operated under rate-card control, as explained in the prior British specification referred to above, and can be modified in other manners. In all cases, however, the decimal product is obtained in the left-hand accumulator.

When the decimal product has been obtained in the accumulator LH, it is transferred to the accumulator FP and is simultaneously converted into the pounds, shillings and pence notation. The "sterling" product in the accumulator FP is then read out to the punching mechanism digit by digit and recorded on the card. During the transfer from the accumulator LH to the accumulator FP, a new card-feeding cycle is initiated during which the next card is read, and the multiplicand and multiplier on it are entered into the registers MC and MP. The right-hand accumulator is reset during the same cycle. After the sterling product has been punched on the card, the accumulators LH and FP are reset. After these have been reset, multiplying operations are initiated with respect to the next card, from which the factors have already been read and entered into the registers MC and MP.

Plug-up of read-in circuits

The accumulator LH is arranged to register a number which is a decimal fraction of one shilling and has a predetermined number of denominations for registering the fractional parts of this product, the remaining higher denominations being employed to register the integral part of the product. The machine illustrated in the drawings has eight denominational multiplier and multiplicand registers MP and MC, and a sixteen-denominational decimal product accumulator LH. As shown, the higher eight denominations of the accumulator LH are arranged to register the integral part of the product, and the lower eight denominations the fractional part of the product. The amounts must be entered into the two registers MP and MC in such a manner that the sum of their denominations in their integral part and the sum of their denominations in their fractional parts are both equal to eight. The manner in which the multiplicand and multiplier are entered into the machine can best be explained by a specific example.

Assume that the largest shillings amounts likely to occur lie between one hundred and one thousand shillings, while the smallest require five decimal places in order that they may be expressed with sufficient accuracy. The cards will have eight-column multiplicand fields of which the three highest columns register the integral digits of the amounts and the remaining five columns the decimal digits of the amounts. Referring to Figure 2a, the multiplicand fields are read by the brushes 109, between A and B, and sockets 211 connected to these brushes are connected by plug wires 400a, to sockets 212 which are connected to counter-magnets 213MC controlling the register MC. The brushes 109 between A and B are connected to the three highest magnets 213MC so that magnets will be energised in response to holes in the three highest columns of the multiplicand field, and will cause the register to register the integral digits of the shillings amount. The remaining lower magnets will cause the register to register the decimal digits of the shillings amount. Since the register MC is a conventional Hollerith counter of the kind whose operation is well known, it is unnecessary to describe it in detail, and it will be sufficient to state that the digits entered into the register are determined by the time at which the various magnets 213MC are energized.

Assume that the shillings amounts are to be multiplied by quantities which will not exceed one hundred thousand units, and which are expressed to one-tenth of a unit, i. e., to one place of decimals. These quantities will also be registered in eight column fields, and the lowest column will register the decimal digit and the remainder the integral digits of the quantities. Since the quantities do not exceed one hundred thousand units, the two highest columns will always contain zero. Brushes between C and E read the multiplier field of the card, the brush between D and E reading the decimal column in each of these fields. Since there are five decimal denominations in the register MC there must be three in the register MP. The brush between D and E is therefore connected by a plug-wire 400b to the third lowest magnet 213MP of the multiplier register MP. This magnet is the third from the top in Figure 2a. The register MP will thus have three decimal denominations and five integral denominations. The five highest magnets are therefore connected to the five lower brushes 109 reading the integral columns of the multiplier field.

It will be understood that the system of connection adopted depends upon the circumstances of each case. For instance, if the multiplier quantities are such that four decimal places are required in order to express with sufficient accuracy, the four brushes reading columns containing the decimal digits of the quantities will be connected to the four lowest magnets 213MP. In this case, each of the brushes reading the sterling amount would have to be connected to the magnet one lower than that shown in Figure 2a, in order that the register MC should contain only four decimal places. On the other hand, if the quantities exceeded one hundred thousand and were, say, less than one million, each of the brushes reading the quantities should be connected to the magnet 213MP, one lower than that shown in Figure 2a, while the connection between the brushes reading the shillings amount should be to the magnet one higher than that shown in Figure 2a, i. e., the magnet immediately below the letter C in Figure 2a, should be connected to the second magnet 213MC from the top, and so on.

Before describing the present improvements, the manner in which the machine operates will first be explained in more detail with reference to Figures 2a and 2f.

Starting circuits

With the main motor in operation current is supplied from the D. C. section 52—DC (Figure 2f) of the generator to the main supply lines 201 and 202, while current is supplied from the A. C. section 52—AC of this generator (Figure 2a) to earth and to a main line 203. After the cards have been placed in the magazine, a start key is depressed to close contacts 196 (lower left, Figure 2f). A circuit is then completed through cam contacts FC—2, now closed, relay contacts G—1, now closed, the contacts 196 and a relay coil C. This coil closes contacts C—2 to hold itself energized through cam contacts FC—8. The relay C also closes contacts C—1 (centre, Figure 2f) to complete a circuit through contacts P—1, C—1, N—1, stop key contacts 197, cam contacts FC—6, the card-feed clutch magnet 222 and contacts F—1. The magnet 222 then engages the card-feed-clutch, and the machine performs a card-feeding operation in which the first card is fed to the intermediate position. In this position the card closes the contacts 112, (lower right, Figure 2f) which energize a relay coil H. This coil closes its contacts H—1 (Figure 2a) to prepare the card-reading circuits.

The start key is again depressed to close the contacts 196 and initiate a fresh card-feeding cycle in the same way as the first card-feeding cycle. During this cycle the cam contacts FC—11 close to complete a circuit through the contacts 12, the contacts FC—11 and a relay coil G. The coil G opens its normally closed contacts G—1 to prevent the further establishment of the circuit through the start contacts 196, and closes its normally open contacts G—1 to provide a holding circuit for itself through contacts FC—2. The coil G also closes contacts G—2 to provide a holding circuit for the coil H through the contacts G—2 and the contacts FC—2. The contacts FC—2 open during each card-feeding cycle, and at this time the holding circuit for the coil G extends through the normally open contacts G—1, which are now closed, the contacts G—2 and the contacts 112, which are closed while the contacts FC—2 are open if cards continue to be fed from the magazine. The coils G and H are thus maintained energized so long as cards feed from the magazine to the machine.

During this second card-feeding cycle the amounts on the card are read and entered into the registers MP and MC. The reading circuits extend from the line 203 (Figure 2a), through the contacts H—1 which have been closed by the coil H, cam contacts FC—7, an impulse distributor 188, the common contact roll 87, the brushes 109, plug connections 400a and 400b and the counter magnets 213MP and 213MC to earth. The amounts read from the cards are thus registered in the registers MC and MP.

As the card is delivered to the R position (Figure 1b) it closes the contacts 120 (Figure 2f). These contacts energise a relay coil F. A circuit is then completed from the line 203 (Figure 2a) through contacts CC—2, K—2, L—2, and F—2, to the reset magnets 223LH and 223FP of the accumulators LH and FP. These two product accumulators are then reset to zero in the following cycle. The contacts K—2 are closed, since their coil K (Figure 2f) is energised through contacts P—5 in the punching mechanism. As explained in the United States specification referred to above, these contacts are closed whenever the punching machine is in condition to eject the card in it. They reopen as soon as the feed of the next card through the punching mechanism is initiated.

The coil F also opens its normally closed contacts F—1 (Figure 2f) and closes its normally open contacts F—1'. The closure of the latter contacts completes a circuit through them, contacts CC—3, a punch clutch-magnet 143, contacts P—3 and contacts K—1, which are closed by the coil K. The magnet 143 engages a clutch, not shown, and couples punching mechanism to a driving motor (also not shown), so that the punch is actuated to feed the card through it. The contacts P—3 are closed if, as explained in the above mentioned United States specification, the preceding card has been properly ejected, so that the feed of a new card through punching mechanism can only occur if the preceding card has been ejected. These contacts reopen as soon as the feed of the new card commences.

When the magnet 223FP is energized, it couples a cam 192 to the reset shaft 63, and this cam closes a pair of contacts FP—1. In the same way, the magnet 223LH couples a pair of cams 189 and 196 to the reset shaft, and these cams close a pair of contacts LH—1, open a pair of contacts LH—2 and close a pair of contacts LH—3. The closure of the contacts LH—3 (Figure 2f) completes the circuit through a coil L, which closes its contacts L—1 to hold itself energized through punch contacts P—2. The coil L also opens the contacts L—2, (Figure 2a) so as to prevent a re-energization of the magnets 223LH and 223FP. The contacts P—2 (Figure 2f) maintain the coil L energized until the contacts P—5 in the punching mechanism open and de-energize the coil K so that its contacts K—2 (Figure 2a) open to open the circuits to the reset magnets 223LH and 223FP.

*Multiplying circuits*

The contacts FP—1 and LH—1 complete a circuit from the main DC line 201 (Figure 2a) through the contacts in question and coils M and N to the line 202. The coil M closes its contacts M—2 to provide a holding circuit through contacts MC—3 which are normally closed, and the coils M and N to the line 202. The coil N opens its contacts N—1 (Figure 2f) in the circuits for the card-feed clutch magnet 222, so that no card-feeding cycle can be initiated while multiplying operations are in progress.

Each register and accumulator in the machine is provided with a reading-out mechanism which is designated in the circuit diagram with the same reference as the corresponding accumulator and suffix RO. Thus the multiplier register has a read-out mechanism MPRO (Figure 2a). This mechanism comprises, for each denomination, two electrically separate pairs of brushes 160 and 161. Each group of brushes 160, 161, is angularly adjusted, in accordance with the digit registered in the corresponding denomination of the register, relatively to a commutator structure. The arrangement is such that the brush 160 is adjusted to connect a corresponding digital conducting segment 162 to a common segment 163, while the brush 161 is similarly adjusted but completes no circuit unless zero is registered, when it connects a zero segment 164 to a common segment 165.

When the contacts M—2 close, a circuit is completed through contacts MC—3, M—2, a line 224, all the zero segments 164 as are engaged by a brush 161, the corresponding common segments 165, and the connected ones of a number of relay coils Yu, Yt, etc. There is one of these relays for each denomination of the register, and those of them that correspond to denominations in which zero is registered will be energised. The energised coils Yu, Yt, etc., close their contacts Yu1, Yt1, etc., and also shift contacts Yu2, Yt2, etc. Thus those of the Yu2, Yt2, etc., contacts which correspond to denominations in which zero is registered will be shifted from the position shown.

With the plugging shown in Figure 2a, no entries will be made into the two lowest denominations of the multiplier register. Consequently, both these denominations will register zero, and both the relays Yu and Yt will be energised, and contacts Yu2, Yt2 shifted. When cam contacts CC—2 close, a circuit will be completed from the line 203 through the contacts CC—2, the contacts M—1, the normally open contacts Yu2 and Yt2 in series, the normally closed contacts Yh2, a column-shift relay coil CSh, the common sector 163h of the hundreds denomination, the brush 160h of the hundreds denomination, the segment 162h on which this brush rests, a connected line 226, and one of nine relay coils X1 to X9, to earth. This coil is thus energized momentarily and closes its related contacts, which remain closed until the end of the cycle, when they are mechanically re-opened. These X1 to X9 relays are the relays contained in the mechanism MPR shown in Figure 1b.

If the hundreds digit were 3, the relay X3 would have been energized and its contacts closed, if the digit is 4, the relay X4 and so on. With these contacts closed, circuits are completed from the line 203, through the emitter EM1, the contacts of the energized relay X3, lines 227LH and 227RH, the reading-out mechanism MCRO of the multiplicand register MC, lines 228LH and 228RH, contacts CSh4—11 and CSh12—19, lines 229LH and 229RH, the counter-magnets 213LH and 213RH, of the left-hand and right-hand accumulators respectively. The contacts CS$h$4—19 are closed when the column-shift relay CS$h$ is energized, and remain closed until the end of the cycle, when they are mechanically opened. The relay CS$h$ is one of those contained in the mechanism shown at CS and CR, Figure 1b.

The circuits shown in Figures 2b and 2c are fully explained in British Patent specification No. 358,105 and need not be explained in detail herein. As the result of the completion of the circuits through the energized relay X1 to X9 during this cycle the accumulators RH and LH will add two partial products of the multiplicand and one digit of the multiplier.

During this cycle, contacts CS$h$3 are closed to complete a circuit through the contacts MC—3, M2, the contacts CS$h$3, and the coil Y$h$. This coil closes its contacts Y$h$1 to hold itself energized, and also shifts the contacts Y$h$2. At the beginning of the next cycle the contacts CC—2 close again to complete a circuit through themselves, the contacts M—1, the contacts Y$u$2, Y$t$2, Y$h$2 in series, the normally closed contacts Y$th$2, the coil CS$th$, the reading-out mechanism MPRO in the thousands denomination, and the coil X1 to X9 corresponding to the digit registered in the thousands denomination. The machine then proceeds to multiply by the thousands multiplier digit, and the multiplying cycles proceed until all of the contacts Y$u$2, to Y$tm$2 have been shifted.

After this has occurred, the closure of the contacts CC—2 will complete a circuit through all the normally open contacts Y$u$2 to Y$tm$2 in series, and the reset magnets 223MC and 223MP and a relay coil 1CR to earth. The energization of the reset magnets will result in the multiplicand and multiplier registers being reset during the cycle in progress.

The relay coil 1CR closes its contact 1CR—1—16 (Figure 2c) and these contacts remain closed until the end of the cycle when they are mechanically reopened. Closure of these contacts prepares circuits extending from the line 203 (Figure 2b) through the emitter EM1, lines 230, the reading-out mechanism RHRO (Figure 2c) of the accumulator RH, the contacts 1CR—1—16, the lines 229LH and the counter-magnets 213LH of the left-hand accumulator, to earth. The right-hand partial-product in the accumulator RH is thus transferred to the accumulator LH, and added to the left-hand partial-product in the latter accumulator. Thus, the accumulator LH will contain the final product as a decimal amount.

Resumption of card feed

During the resetting of the multiplicand register, contacts MC—1 are closed by a cam which is clutched to the reset shaft by the reset clutch, and energize the relay coil C. This coil, in the manner previously explained, initiates a new card-feeding cycle by energizing the card-feed clutch-magnet 222, so that the next card is fed and read, and the next pair of factors are entered into the multiplicand and multiplier registers in the cycle following the transfer of the right-hand partial product to the accumulator LH. Contacts MC—2 are also closed to energize a relay coil D. This coil closes the contacts D—2 to provide a holding circuit for itself through cam contacts CC—1 which open at the end of the cycle. The coil D also closes contacts to prepare circuits by which the decimal product is converted into a sterling product and entered into the accumulator FP. These circuits will be described later.

Read-out for accumulator LH

The reading-out mechanism for the accumulator LH will first be described. This reading-out mechanism is associated with the ten highest denominations of the accumulator only, there being no reading-out mechanism for the six lowest denominations which are provided to ensure that the product is obtained accurately. The mechanism is shown diagrammatically in Figures 2d and 2e with the commutator associated with the highest denomination to the right, and that associated with the lowest denomination to the left, which is the reverse to the arrangement which would be adopted in practice.

Figure 3:
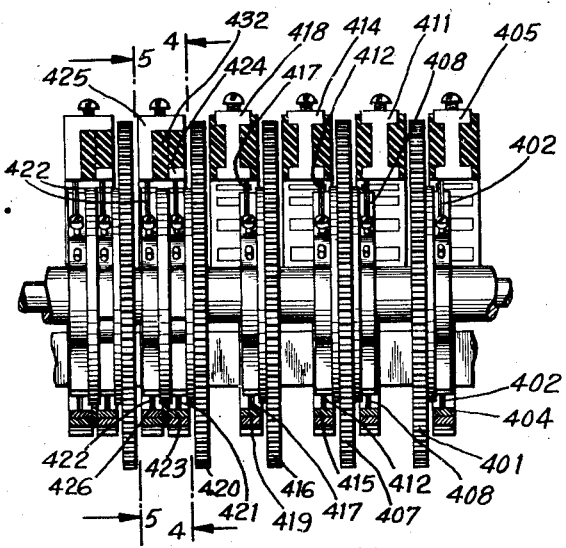
Figure 3 is a section through reading-out mechanism of an accumulator in the machine. This figure is a section on the line 3—3 of Figure 4.

The registering wheel associated with the seventh denomination, which registers one-hundredths of a shilling, drives a gear-wheel 401, Figure 3, to which is secured a pair of brushes 402. These brushes cooperate with a commutator comprising a semi-circular conducting segment 404 and a set of ten contacts 405 which are embedded in a semi-circular insulating member 406. Each of the contacts 405 corresponds to a digit, and the brushes 402, which are electrically connected together, are adjusted in accordance with the digits registered to connect the corresponding contact 405 to the common segment 404. The gear-wheel 407, which is driven by the eighth registering wheel of the accumulator, carries a pair of brushes 408, co-operating with ten contacts 411 and a common strip 410 in the same manner. This wheel carries a second pair of brushes 412 on its other side and these co-operate with contacts 414 and a common strip 415. Only the contact 414 corresponding to the digit nine, however, is connected in circuit, so that circuits are only completed through the brushes 412, when the one-tenth of a shilling digit is nine.

The gear-wheel 416 for the ninth denomination, which registers the units of shillings, carries a pair of brushes 417, co-operating with ten contacts 418, and a common segment 419.

The tens of shillings wheel 420 carries two pairs of brushes 421 and 422 on one side. The brushes 421 co-operate with the common segment 423 and five contacts 424. The brushes 422 co-operate with a set of five contacts 425 and a common segment 426. This arrangement is repeated for each higher denomination.

Figure 4:
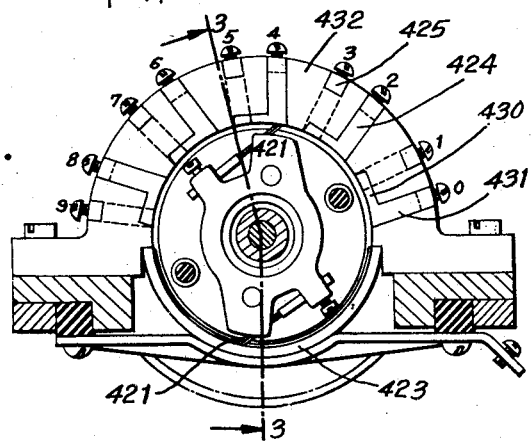
Figure 4 is a section on the line 4—4 of Figure 3.
Figure 5:
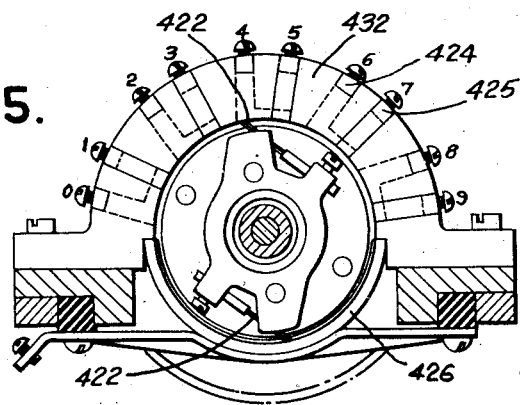
Figure 5 is a section on the line 5—5 of Figure 3.

Referring now to Figure 4, the contacts 424 each comprise a portion 430 co-operating with the brushes 421, and of such length that each contact can be engaged by a brush when the latter is in either of two adjacent positions. Each contact thus corresponds to two of the contacts of the lower denominations. The digit-indicating positions of the brushes are indicated by index numbers in Figure 4. Each contact 424 also comprises a portion 431 extending along the side of the insulating member 432 and then over the outer surface thereof so that a connection can be made to the contact by means of suitable screws. From Figure 3 it will be observed that the portion 430 of each contact extends less than half-way across the insulating member, so that these contacts are only engaged by brushes on the left. The contacts 425 (Figure 5) extend down the other side of the insulating member 432 and also across its outer arcuate surface in order that connections may be made to them. The lower ends of these contacts are of such width that they are only engaged when the brushes represent odd digits.

In Figure 2e, a separate contact 424 is shown for each digit and these are shown as being electrically connected together in pairs. It will be appreciated that this arrangement is electrically equivalent to that just described.

Conversion of decimal product into sterling notation

It has previously been explained that the relay D is energized after the complete decimal product has been obtained in the accumulator LH. This relay closes its contacts D—1 (Figure 2d) to complete a connection from the line 201, through a line 439, contacts D—1, and a line 438 to the emitter EM2. This emitter rotates in synchronism with the cycle of the machine, and completes a connection from the line 438 to lines 437 in succession, so that each of these lines receives an impulse at a time corresponding to a different digit.

Lines 451 extend from the lines 437 associated with the digits 1, 2, 3, 4 and are connected to the segments 424 for the digits 2 and 3, 4 and 5, 6 and 7, and 8 and 9. In the case of the highest denomination, these connections are direct, while in the case of the remaining denominations, the connections are through normally closed relay contacts 440a, 441a ... 445a. In Figure 2e, connections for the thousands, ten thousands and hundred thousands denominations have been omitted to avoid duplicating the circuits unnecessarily. The common segments 423 are connected respectively through wires 452 to the pounds counter-magnets 213FP of the accumulator FP.

The common segments 426 are connected by a wire 453 and cam-contacts CC—6 to the line 438, while the segments 425 for each denomination are connected together, and to the appropriate one of relay coils 440 to 445. It should be noted that the relay contacts 444a and 444b and the relay coils 441 are not shown and also there are two other relays 442 and 443, not shown. The omission of these elements from the drawings is due to the omission of the thousands, ten thousands and hundred thousands denomination of the mechanism LHRO. The contacts 425 for the highest denomination are connected by lines 454 to the coils 445, the contacts 425 for the millions denomination by a line 455, to the coils 444, contacts 425 for the hundreds denomination by a wire 456 to the coil 440.

The operation of these circuits can best be understood by taking specific examples. Assuming that the two right-hand, highest, denominational orders of the register contain 2 and 4 respectively, as shown in Figure 2e, a circuit will be completed at the "1" time in the cycle through the emitter EM2 (Figure 2d), the "1" line 437, the "1" line 451 (Figure 2e), the "2" segment 424 and the brush 421 for the highest denomination, the highest segment 423, the right-hand line 452, and the highest counter-magnet 213FP, which will cause "1" to be entered into this denomination. Since the highest digit is even, the brush 422 in the highest denomination will not rest upon any of the contacts 425 of the highest denomination, and no circuit will be completed through the line 454 to the relay coils 445 which will remain deenergised. The contacts 445a will therefore remain closed, and a circuit will be completed through the emitter EM2, at the "2" time in the cycle, the "two" line 451, the middle pair of contacts 445a, the "four" contact 424 in the millions denomination, the corresponding brush 421 and common segment 423, the second line 452 to the right and the counter-magnet 213FP to the hundred-thousands denomination of the accumulator FP. Thus 24 million shillings is entered as £1,200,000, the original amount having been divided by 20 during the entry.

The brushes 421 and 422 for the hundreds of shillings denomination are shown in Figure 2e as registering "3", so that a circuit can be completed early in the cycle from the line 438, through the contacts CC—6, the line 453, the common segment 426 for the hundreds denomination, the brush 422, the "3" contact 425 for this denomination, the line 456, and the relay coils 440 (Figure 2d). These coils open their contacts 440a and close their contacts 440b (Figure 2e). When the emitter EM2 commences to emit impulses, the segments 424 for the tens denomination are connected to the lines 451 corresponding to the digits 5 to 9. The tens brushes 421 and 422 register 5, and a circuit is completed through the emitter EM2 (Figure 2d) at the seven time in the cycle, the "7" line 451, the centre pair of contacts 440b, the tens "5" segment 424, the tens brush 421, the tens segment 423, and the tens line 452 through the units of pounds counter-magnet 213FP. Thus, "seven" will be entered into the units of pounds denomination of the accumulator FP.

Assume that the thousands digit was zero or an even number, then the contacts 441a will be closed due to the non-energization of their controlling coil 441 and a circuit will be completed for the hundreds denomination at the "one" time in the cycle to energize the tens of pounds counter-magnet 213FP. This circuit is traceable from emitter EM2, "one" wire 451, the second pair of contacts 441a from the left, "3" segment 421, segment 423, wire 452 to the tens of pounds magnet 213FP. The hundreds and tens denominations of the accumulator LH register 350, and 17 which is one-half of 350, leaving 10 over, is entered into the accumulator FP.

It will be appreciated, when, as in the example considered above, the tens digit in the left-hand accumulator is odd, there will be a remainder of 10, as the result of dividing by 20, and this remainder is entered as 10 shillings onto the tens of shillings wheel of the accumulator FP in the following manner. When the tens digit is odd, a circuit is completed from the line 453 (Figure 2e) through the tens brush 422, a line 457 and a relay coil 458 (Figure 2d). This coil closes its contacts 458a so that a circuit is completed through the emitter EM2 at the "one" time in the cycle, a line 459, the contacts 458a, a line 460, and the tens of shillings counter-magnet 213FP (Figure 2e). If the tens of shillings digit in the accumulator LH is even, no circuit will be completed through the coil 458 so that no circuit can be completed to the tens of shillings counter-magnet 213FP.

The units of shillings digit in the accumulator LH is transferred directly into the accumulator FP. As shown in Figure 2d, the brushes 417 register six, and the transferring circuit is completed at the "6" time in the cycle through the emitter EM2, the "6" line 437, the "6" contact 418, the brushes 417, a line 461 and the units of shillings counter-magnet 213FP (Figure 2e).

The mechanism just explained divides the integral parts of the decimal product by 20 and obtains a pounds quotient and a shillings remainder in the accumulator FP. In order to obtain the pence digit in the final product accumulator, means, which will now be explained, is provided for translating the tenths and hundredths digits of the decimal product to a pence digit.

The machine is provided with ten multi-contact electric relays which will be referred to as the relays 0, 1, 2 ... 8, 9 respectively. These relays have each an operating coil 0—0, 1—0, 2—0, etc., a relatching coil 0—R, 1—R, 2—R, etc. (Figure 2d), and eleven normally open pairs of contacts. The contacts are normally held open by a member (not shown) which is latched in the contact-opening position by the armature of the operating coils 0—0, 1—0, etc. When this coil is energized it attracts its armature and releases the contact-opening member which allows the contacts to close. The contacts are re-opened by energizing the relatching coil 0—R, 1—R, etc., which moves the contact-opening member back to the open position where it is held by the armature of the operating coil. Such a relay is shown in British Patent No. 413,327, accepted July 13, 1934, at Fig. 5 thereof.

Each of these relays is appropriated to the digit by which it is designated. The operating coil of each relay is connected to the corresponding segment 405 for the one-hundredths denomination, so that the relay corresponding to the one-hundredths digit will be energized. The circuit extends from the A. C. supply line 203, through contacts D—3, closed by the relay D, cam-contacts CC—4, the appropriate relay coil, which, with the setting shown in Figure 2d, is the coil 1—0, the connected segment 405, the brushes 402 and the common segment 404, to earth.

The energized relay 1 closes its contacts 1a, so that at the end of the cycle a circuit can be completed through cam-contacts CC—5, which close at this time, the contacts 1a, a control relay coil 470, and the relatching coil 1—R. The control coil 470, of which there is one for each relay 0 to 9, closes its contacts 470a to provide a holding circuit through the relatching coil 1—R and the cam-contacts CC—5, in parallel with the contacts 1a. The relatching contact 1—R restores the relay to its normal condition. The control relay 470 is provided to ensure that the relatching coil shall be fully energized despite the opening of the contacts 1a during the relatching operation. It will be seen that one of the relays 0 to 9 will be energized at the beginning of the cycle and will remain energized until the end of the cycle when it will be automatically restored to its normal condition.

The remaining one-hundred contacts of the relays 0 to 9 are shown in a vertical column, Figure 2d, the numerals between the contacts identifying them with the particular relays to which they belong. It will be noted that they are arranged in ten groups, each group comprising a pair of contacts from each relay. Each group is associated with a separate one-tenth digit as indicated by the numerals to the left of the contacts (Figure 2d). Each group of contacts is connected to the contacts 410 for the corresponding one-tenth digit except the group 9. In this group the contacts for the relays 0 and 1 are connected to the contacts 410 of the digit 9, while the remaining contacts of the group 9 are connected to the contacts 414 for the one-tenth denomination.

It will be noted from Figure 2d that the brushes 408 and 412 will connect in circuit the particular group of contacts corresponding to the one-tenth of shillings digit registered in the accumulator LH.

Each pair of contacts is thus associated with a one-tenth digit in accordance with the group in which it occurs, and with a one-hundredth digit in accordance with the relay to which it belongs, and may conveniently be designated by these two digits, i. e., the contacts of relay 7 in group 0, are the contacts 07, while the contacts of this relay in group 1 are the contacts 17 and so on. Adopting this system of designation, it will be noted that the contacts in Figure 2d are arranged in order starting at 99 at the top and continuing serially down to 00 at the bottom.

The contacts provide one hundred different circuits in accordance with the one hundred different values which the one-tenths and one-hundredths of shillings digits may have. One group of ten of these contacts are connected in circuit by the reading-out brushes 408, 412, for the one-tenths denomination, and of these ten contacts, one will be closed owing to the energisation of its relay coil in accordance with the one-hundredth digit registered. Thus, a unique circuit is completed.

The following table shows in its second column the decimal of one shilling equivalent to the pence value shown in the first column.

*Table*

| Pence digit | Exact decimal equivalent | Assumed decimal equivalents |
| --- | --- | --- |
| 0 | 0.0 | .00 |
| 1 | .083 | .01 to .08 |
| 2 | .166 | .09 to .16 |
| 3 | .25 | .17 to .25 |
| 4 | .333 | .26 to .33 |
| 5 | .416 | .34 to .41 |
| 6 | .5 | .42 to .50 |
| 7 | .583 | .51 to .58 |
| 8 | .666 | .59 to .66 |
| 9 | .75 | .67 to .75 |
| 10 | .833 | .76 to .83 |
| 11 | .916 | .84 to .91 |
| 12 | 1.0 | .92 to .99 |

The present machine is arranged to obtain the product correct to the next higher penny, except when the difference between the decimal product and the next lower penny is very small. The third column of this table shows the values, in decimals, of one shilling, which are assumed to be equal to the pence values shown in the first column. Thus, 0.01 to 0.08 of one shilling is assumed to be equal to one penny, and 0.09 to 0.16 of one shilling is assumed to be equal to two pennies, and so on.

The emitter EM3 is arranged to connect eleven lines 462 in turn through the contacts D—1 to the main supply line 201 at the times corresponding to the pence digit 1 to 11. Thus, each of the lines 462 can transmit an impulse representing a separate pence digit as indicated by the indices against the line. The arrangement is such that each line is connected to the contacts of the relays 0 to 9 which correspond to the decimal equivalents of the pence digit associated with it. Thus, the line 462 associated with the pence digit 1 is connected to the contacts 01 to 08. The line 462 for the digit 2, to the contacts 09 to 16, and so on, the connections corresponding to the third column of the table given above.

In the example shown, the one-tenths digit is 9 and the one-hundredths digit is 1. Thus, the relay 1 is energised, and a circuit is completed through the contacts D—1, the emitter EM3 at the "eleven" time in the cycle, the line 462 for the digit 11, the contacts 91 of the relay 1 in the "nine" group, a line 463, the "9" contact 411, the brush 408, the common segment 410, a line 464, and the pence counter-magnet 213FP (Figure 2e), to the line 202. In this way the pence counter-magnet is energised at the "eleven" time in the cycle and causes eleven pence to be entered into the accumulator FP. Similar circuits may be traced through the remaining contacts 90 to 00.

From the above table it will be seen that the values 0.92 to 0.99 shillings are assumed to be equal to 12 pence. When the tens digit is 9 and one of the relays 2 to 9 is energised, one of the pairs of contacts 99 to 92 will be energised, and a circuit will be completed through the contacts D—1, contacts CC—7, the closed pair of the contacts 99 to 92, a line 465, the contact 414, the brush 412, the segment 415, a line 466, and a magnet 467 (Figure 2e). The magnet 467 trips carry mechanism associated with the units of shillings denomination of the accumulator FP, so that this mechanism is conditioned to cause the units of shillings registering wheel to add one unit as though by a carrying operation. The arrangement of the carry mechanism for this wheel is similar to that shown in Figure 30 of specification No. 405,031 aforesaid, and the magnet 467 corresponds to the magnet 399 shown in that figure.

In this manner the decimal product is converted to an amount expressed in the pounds, shillings and pence or sterling notation and registered in the accumulator FP.

It should be mentioned that the accumulator FP is provided with conventional counter contacts 468 each of which is opened in a known manner when the corresponding counter-magnet is energised in order to interrupt the circuit through that magnet. The counter contacts 468 are provided for the purpose of taking the sparking which might otherwise occur at the emitters EM2 and EM3.

It has been previously explained that a card-feeding cycle is initiated at the end of the cycle in which the right-hand partial product is entered into the accumulator LH. The first half of this cycle is coincident with the transfer of the decimal product from the accumulator LH to the accumulator FP. After this transfer has been completed, cam-contacts FC—4 close to energise a relay coil B. This coil closes its contacts B—2 to hold itself energised through contacts LH—2. This coil also closes contacts B—1 to complete a circuit through a column-selecting commutator 470 to the reading-out mechanism FPRO of the accumulator FP. This mechanism in turn controls the energisation of punch-magnets 471, to record the product on the card in a manner which is fully explained in British specification No. 405,231 aforesaid. On the conclusion of this punching operation, the punch-contacts P—5 are closed in a manner explained in the United States specification aforesaid, to energise the coil K, which closes its contacts K—2 (Figure 2a) to energise the reset magnets 223LH and 223FP so that the accumulators LH and FP are reset. As previously explained, this results in the initiation of the multiplying operations for the next card, and the whole sequence of operations is repeated in respect of this next card.

The mechanism described can be modified to obtain the final product correct to the next lower or to the nearest penny. If the connections from the line 462 to the contacts of the relays 0 to 9 are shifted upwardly four contacts, and if the contacts 95 to 92 are disconnected from the line 465 and from the contacts 337 and connected to the line 463, the result will be obtained correct to the nearest penny. With this adjustment, no connection will be made to the contacts 00 to 05. In the same way, if the connections from the lines 462 are shifted upward eight contacts, and all the contacts in the nine group are connected to the line 463, the contacts CC—7, the brush 412, and associated parts being omitted, the result will be obtained correctly to the next lower penny. In this case, the magnet 467 would also be omitted.

In addition to or instead of recording sterling products on the card, that product can be printed, by providing the machine with a bill printing unit in the manner explained in Daly, United States application Serial No. 643,663, filed November 21, 1932.

If it is desired merely to print the product, but not to punch it, correct to the next lower penny, the bill printing unit can be connected directly to the decimal product accumulator LH, the printing magnets provided in this unit being connected in circuit in place of the counter-magnets of the accumulator FP which would be omitted. It is not possible with this latter arrangement to print the product correct to the nearest or next highest penny, as both the latter operations involve a transfer operation which cannot be performed by the printing mechanism.

I claim:

1. In a multiplying machine, an accumulator having a plurality of denominational order entry receiving sections, a separate readout mechanism for each section, accumulating mechanism controlled thereby, the readout mechanism of the units order section being arranged to control a part of the accumulating mechanism in accordance with the digit entered in said units order section, means associated with the higher denominational order sections for determining whether they contain an even or an odd digit, means controlled by said determining means for causing the readout mechanism of the tens order section to control a further part of the accumulating mechanism to receive unity if the digit in the tens order section is odd and further means controlled by said determining means for causing the readout mechanism of each of the remaining orders, except the highest, to control a still further part of said accumulating mechanism in accordance with one-half of the sum of ten and the digit entered in the accumulator section when the digit in the next higher order section is odd.

2. In a machine of the class described, a plurality of denominational order accumulator wheels, positionable to represent a number, a readout device including a plurality of digit representing contact segments and a pair of brushes for each wheel, one of the brushes of a pair being positionable by its wheel to engage a segment corresponding to the digit set on the related wheel, the other brush of the pair being positionable only on segments related to odd digits, a plurality of relays, means controlled by the second mentioned brushes of said pairs of brushes for completing circuits through the relays, accumulating mechanism, an emitter for emitting a series of differentially timed impulses, one for each digit, to control the operation of said accumulating mechanism, a plurality of sets of contacts, one set for each of said relays and each set being arranged and constructed to respond to control of its related relay to connect each of the segments engaged by the first named of said pair of brushes related to the next lower order to said emitter for control by the impulses relating to the digits 5 to 9, said segments being normally connected by said contacts to said emitter for control by the impulses relating to the digits 1 to 4, and means controlled by said emitter, and segments in accordance with their interconnection for entering an amount into said accumulating mechanism which is one-twentieth of the number set on the accumulator wheels.

3. In a machine of the class described, an entry receiving device having a plurality of denominational order sections, each section comprising a set of contact segments, one for each digit, a second set of contact segments, one for each odd digit, and a pair of brushes settable to cause one of the brushes to engage the segment of said first set corresponding to a digit to be represented and the other brush to engage the corresponding segment of the second set if the digit represented is odd, an impulse emitter for emitting a series of differentially timed impulses, one for each digit, a device controlled thereby, a plurality of connections, means normally connecting each of said first set of segments to said emitter through said connections to cause said device to be controlled by impulses related to the digits 1 to 4, and means controlled by said second set of segments, when a brush is in engagement with any of them for causing said connections related to the next lower denominational order to be shifted to connect said first set of segments with the emitter to cause said controlled device to be controlled by impulses related to the digits 5 to 9.

HAROLD HALL KEEN.